(12) United States Patent
St Pierre et al.

(10) Patent No.: US 12,475,419 B2
(45) Date of Patent: Nov. 18, 2025

(54) TASK MANAGEMENT WITH IMAGE-CAPTURE MONITORING OF USER ACTIONS

(71) Applicant: Oracle International Corporation, Redwood Shores, CA (US)

(72) Inventors: Robert St Pierre, Campbell, CA (US); Jai Suri, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 18/307,448

(22) Filed: Apr. 26, 2023

(65) Prior Publication Data

US 2024/0220895 A1 Jul. 4, 2024

Related U.S. Application Data

(60) Provisional application No. 63/478,326, filed on Jan. 3, 2023.

(51) Int. Cl.
*G06Q 10/0631* (2023.01)
*G06V 20/52* (2022.01)

(52) U.S. Cl.
CPC .......... *G06Q 10/06316* (2013.01); *G06Q 10/063114* (2013.01); *G06V 20/52* (2022.01)

(58) Field of Classification Search
None
See application file for complete search history.

(56) References Cited

U.S. PATENT DOCUMENTS

| | | | | |
|---|---|---|---|---|
| 7,155,400 B1 * | 12/2006 | Jilk | ............. | G06Q 10/06316 |
| | | | | 705/7.41 |
| 7,836,448 B1 * | 11/2010 | Farizon | ............. | G06F 9/4843 |
| | | | | 709/225 |
| 9,239,719 B1 * | 1/2016 | Feinstein | ............. | G06F 8/70 |
| 2009/0282413 A1 * | 11/2009 | Cialini | ............. | G06F 9/4881 |
| | | | | 718/102 |
| 2010/0332280 A1 * | 12/2010 | Bradley | ............. | G06Q 10/06316 |
| | | | | 705/7.26 |

(Continued)

FOREIGN PATENT DOCUMENTS

| | | | | |
|---|---|---|---|---|
| WO | WO-2014133820 A1 * | 4/2016 | ............. | G16H 40/20 |
| WO | WO-2018141012 A1 * | 8/2018 | ............. | G06Q 10/063112 |

OTHER PUBLICATIONS

Stories "Task management: what it is and how to master it", Dec. 2021, Pages (Year: 2021).*

(Continued)

*Primary Examiner* — Romain Jeanty
(74) *Attorney, Agent, or Firm* — Invoke

(57) ABSTRACT

Techniques for presenting a user with instructions for completing tasks based on monitoring images of user actions are disclosed. A system monitors user actions to identify a next operation in a set of operations to present to a user. The system presents to the user instructions for completing the next operation. The system monitors user actions and may also monitor a manufacturing component status or operating equipment status to determine whether an operation has been completed. The system may reorder a sequence of operations for a particular task based on one or both user input and identifying a different sequence of operations associated with a superior task execution rating.

26 Claims, 10 Drawing Sheets

(56) References Cited

U.S. PATENT DOCUMENTS

| | | |
|---|---|---|
| 2012/0158452 A1* | 6/2012 | Shafiee ............ G06Q 10/06316 |
| | | 705/7.26 |
| 2014/0278638 A1 | 9/2014 | Kreuzkamp et al. |
| 2015/0269508 A1* | 9/2015 | Damboritz ............. G16H 40/20 |
| | | 705/2 |
| 2016/0117367 A1* | 4/2016 | Maloy ................. G06F 16/2365 |
| | | 707/722 |
| 2016/0118085 A1 | 4/2016 | Ptitsyn |
| 2019/0258985 A1 | 8/2019 | Guastella et al. |
| 2020/0043355 A1 | 2/2020 | Kwatra |
| 2023/0004727 A1* | 1/2023 | Oberoi .................... H04L 51/02 |

OTHER PUBLICATIONS

Craig "Task Management: The Ultimate Guide", Nov. 2020, Project Management, pp. 1-11 (Year: 2020).*

* cited by examiner

TASK MANAGEMENT WITH IMAGE-CAPTURE MONITORING OF USER ACTIONS

INCORPORATION BY REFERENCE; DISCLAIMER

The following application is hereby incorporated by reference: application no. 63/478,326, filed Jan. 3, 2023. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to managing execution of user tasks by monitoring images of user positions to monitor user actions. In particular, the present disclosure relates to analyzing user actions recorded with a video monitoring application to determine task characteristics associated with the user actions.

BACKGROUND

In many environments, users must perform a set of steps to complete a particular task. For example, a user may perform a set of steps to assemble a component in a manufacturing environment. The set of steps may include interacting with pieces of equipment in a workspace. A system may provide feedback for completing the set of steps. For example, the system may provide a display representing what actions a user must perform to complete operations associated with a particular task. Often it is difficult for a user to interact with a user interface while completing a set of operations. For example, in the manufacturing environment, the user may be wearing gloves. In addition, a sequence of operations may require two hands, such that interrupting the sequence to interact with the user interface would delay completion of the task.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
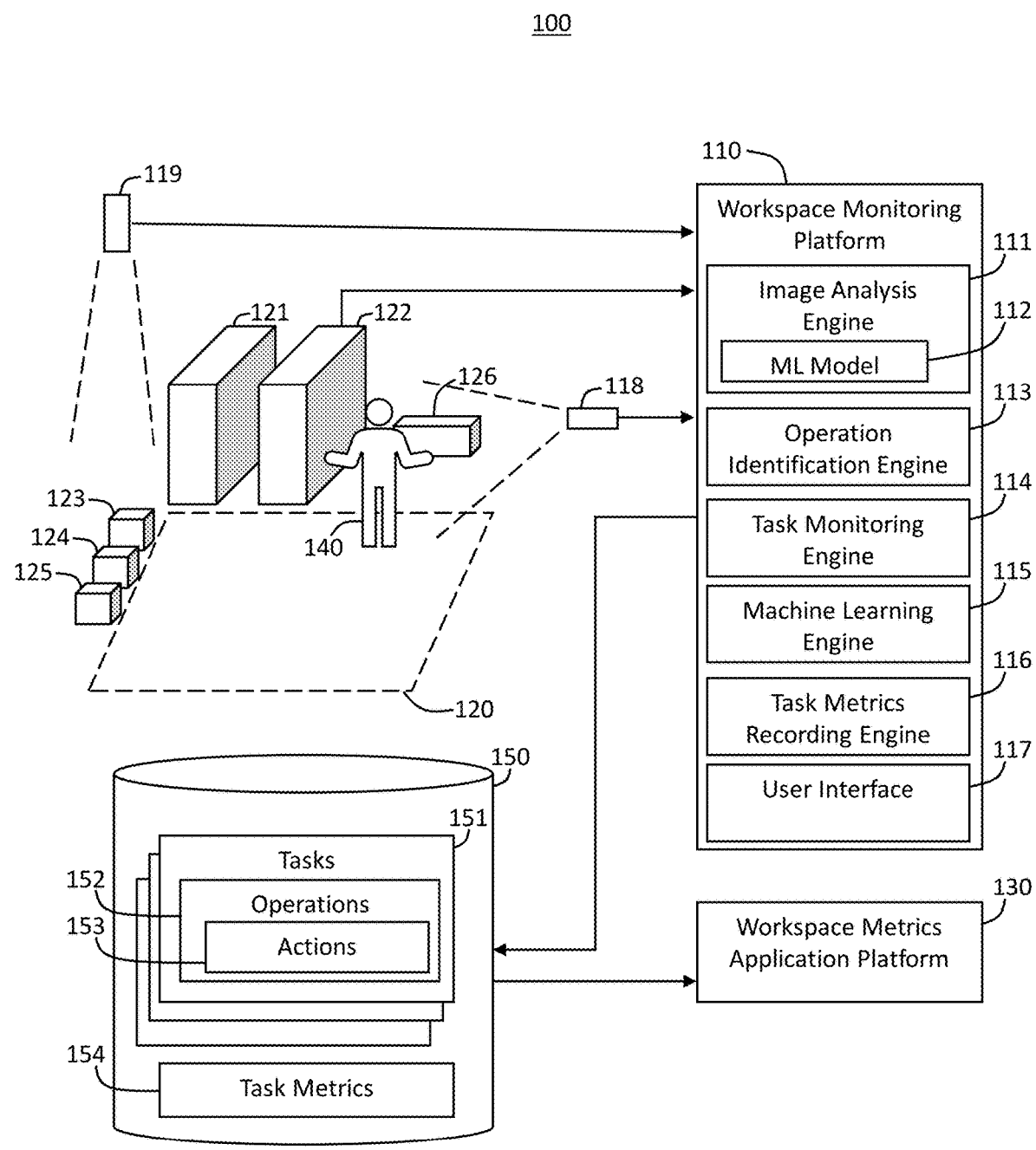
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PRESENTING USER TASK OPERATIONS BASED ON DETECTED USER ACTIONS
3.1 INITIATING BRANCHING TASKS
3.2 TRIGGERING RECORDING OF STATISTICS ASSOCIATED WITH TASKS
3.3 MONITORING TASK METRICS BASED ON DETECTED USER ACTIONS
4. MACHINE LEARNING MODEL TRAINING
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments display instructions associated with executing a next operation of a task in response to detecting completion of a current operation of the task via real-time analysis of a video stream of a user(s) completing the current operation of the task. The system initially displays instructions for performing a current operation of a task in a set of operations. Concurrently with displaying instructions for the current operation, the system continuously analyzes a video stream of a user in real-time while the user is performing actions to complete the current operation. Based on the continuous analysis of the video stream, the system detects that the user has completed the current operation. The system uses the detected completion of the current operation of the task as a trigger to switch from displaying instructions for the current operation to displaying instructions for the next operation in the set of operations.

One or more embodiments generate predictive statistics based on analysis of a video stream of a user(s) performing a set of operations of a task. The system analyzes a video stream of a user to detect a start and/or an end time corresponding to performance of an operation. The start and/or end time of one or more operations are used to generate predictions corresponding to set of operations. As an example, the system predicts a delay for completion of the complete set of operations for a task based on a detected start time of a current operation of the task, an estimated time for completing the current operation, and estimated times for completing operations and tasks that are to be performed subsequent to the current operation. In another example, the system predicts a delay for completion of the complete set of operations based on a detected end time of a current operation, and estimated times for completing operations that are to be performed subsequent to the current operation. The system may store the start and/or end time for any statistical computations associated with the performance of operations.

One or more embodiments perform modifications of a set of tasks to be completed based on real-time analysis of a video stream of a user performing one or more of the set of tasks. In one example, the system selects remediation actions to be performed in response to determining that a user has performed one or more tasks incorrectly, and/or out-of-sequence. The system may insert and present instructions to perform the remediation actions. The system may reorder the remaining tasks based on user's performance of the tasks incorrectly and/or out-of-sequence. A remediation action may undo a performed action, redo a performed action, and/or include a compensatory action that reverses a negative effect of an incorrect and/or out-of-sequence task. Alternatively, or in addition, the system may present alerts in response to determining that a user has performed one or more tasks incorrectly, and/or out-of-sequence.

One or more embodiments record statistics associated with user performance of a task based on monitoring user actions. For example, a system may identify a time associated with a user action corresponding to an initial operation of a task. The system may identify another time associated with a user action corresponding to completing a final operation of a task. The system may record a total time required by the user to perform the task. The system may record the statistics as metrics associated with performance of tasks. For example, the system may maintain a record of how long it takes a user to perform a particular task. The system may maintain a metric comparing the user's performance with the performance of other users, or with the same user over time. One or more embodiments use recorded statistics to generate subsequent predictions for operation and task completion times.

One or more example embodiments use image recognition to identify a particular user in a workspace. A system identifies a set of tasks associated with the user and with pieces of equipment in the workspace. The system monitors in real-time, via image recording, user actions in the workspace. The system identifies operations associated with the user's actions. The system presents to the user images on a user interface display. The images are associated with additional operations of a particular task corresponding to the user's actions detected by the system.

One or more embodiments specify a task associated with a work order in a manufacturing environment. A system specifies operations associated with steps required to perform the task. The system generates instructions for directing a user to perform the operations associated with the steps. The system monitors, in real time, via image recording, user actions to determine that the operations associated with the task are initiated and/or completed.

One or more embodiments train a machine learning model to identify user actions corresponding to operations of a task. A system trains the machine learning model with a training data set of image data corresponding to operator body positions and sequences of body positions. The image data may include operator body positions in relation to a workspace. Based on identifying in real time, via image recording, user body positions, the system identifies operations being performed and/or completed by the user.

One or more embodiments described in this Specification and/or recited in the claims may not be included in this General Overview section.

2. System Architecture

A system 100 includes a workspace monitoring platform 110 that monitors user actions in a workspace 120. The workspace monitoring platform 110 obtains image data from an image capture device 118, such as a video camera. The image capture device 110 captures images of a user 140 in the workspace 120. The workspace 120 is a specified geographic region in which a user 140 performs operations to complete tasks. In the example illustrated in FIG. 1, the workspace 120 includes resources 123, 124, and 125 and pieces of operating equipment 121 and 122. The resources 123, 124, and 125 may be used by the user 140 in the course of performing tasks. For example, a resource may be a part of a component 126 that is added to the component 126 during a manufacturing process executed by the user 140. In addition, or in the alternative, the resources 123-125 may be provided to the operating equipment 121 and 122 to perform operations. For example, the operating equipment 121 may be a 3D printer, and the resource 123 may include resin used as material to perform a 3D printing operation.

An image analysis engine 111 analyzes the image data to identify user actions. According to one embodiment, the image analysis engine 111 identifies user actions by providing the image data to a machine learning model 112. A machine learning engine 115 trains the model 112 to identify user actions in image data.

An operation identification engine 113 identifies operations associated with identified user actions. For example, the system may determine that a user pressing a particular button on a piece of equipment 121 in the workspace corresponds to an operation to perform a particular operation using the equipment. In addition, the system may determine that a set of user actions, such as selecting a resource 123 and attaching the resource 123 to the component 126 corresponds to a particular operation associated with assembling a manufactured component. According to one embodiment, the operation identification engine 113 identifies operations 152 associated with identified user actions 153 by referring to a mapping of user actions to operations. The mapping may be stored as a table, as a directed acyclic graph (DAG) tree, or in any other format.

In some examples, one or more elements of the machine learning engine 115 may use a machine learning algorithm to identify one or both of user actions and task operations based on image data content. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., image data including user position data in a workspace) for the target model f. The associated labels are associated with the output variable (e.g., specified user actions, specified task operations associated with user actions) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn one or both of user actions and operations associated with image data of a user in a workspace. In an embodiment, a set of training data includes image data of user positions in a workspace. The image data are associated with labels, indicating one, or both, of user actions and user operations.

In an example, the system initially trains a neural network using a historical data set. Training the neural network includes generating n hidden layers for the neural network and the functions/weights applied to each hidden layer to compute the next hidden layer. The training may further include determining the functions/weights to be applied to the final, n-th hidden layer that compute the final label(s) or prediction(s) for a data point.

Training a neural network includes: (a) obtaining a training data set, (b) iteratively applying the training data set to a neural network to generate labels for data points of the training data set, and (c) adjusting weights and offsets associated with the formulae that make up the neurons of the neural network based on a loss function that compares values associated with the generated labels to values associated with test labels. The neurons of the neural network include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the neural network using the training data set, a test data set, and a verification data set until the labels generated by the trained neural network are within a specified level of accuracy, such as 98% accuracy.

A task monitoring engine 114 identifies a task associated with identified operations. A task 151 is a set of one or more operations. The task may specify operations that should be performed in a particular sequential order. The task may also specify operations that are not required to be performed in a particular sequential order. The task monitoring engine 114 may identify a task based on detecting a particular operation or a particular set of operations. According to one embodiment, the task monitoring engine 114 identifies tasks associated with identified operations or sets of operations by referring to a mapping of tasks 151 to operations 152. The mapping may be stored as a table, as a directed acyclic graph (DAG) tree, or in any other format.

The task monitoring engine 114 determines whether a user action identified by the image analysis engine 111 corresponds to a particular operation of the task. For example, if a task includes operations A, B, and C, and if the task monitoring engine 114 determined the user performed operation A, then the task monitoring engine 114 monitors the next user action to determine whether the next user action corresponds to operation B or operation C.

While a user 140 is performing a particular task, the task monitoring engine 114 displays on the user interface 117 a subsequent operation to be performed by the user 140. For example, if the task monitoring engine 114 determines that the user completed operation B in a set of operations, the task monitoring engine 114 may cause the user interface 117 to display an image corresponding to a next operation in the set of operations. In addition, if the task monitoring engine 114 determines that a detected user action corresponds to a system operation trigger, the task monitoring engine 114 initiates the system operation. For example, the task monitoring engine 114 may determine that a detected user action does not correspond to an operation in a currently-executing task. The task monitoring engine 114 may perform an operation such as: generating an error notification, generating a prompt to add a new operation corresponding to the detected user action to the task, or initiating a branching task to correct a user error.

The user 140 interacts with the user interface 117 to perform a task. For example, a user 140 may interact with the user interface 117 to select a task to be performed. In addition, or in the alternative, the user 140 may interact with the user interface 117 to confirm a change to a particular task. The user interface 117 includes a display device to present to the user 140 instructions for completing an operation. The instructions may include text content and/or image content. According to one embodiment, the task monitoring engine 114 controls the user interface 117 to present to the user 140 instructions for performing the next operation in a set of operations.

The task metrics recording engine 116 records metrics 154 associated with tasks. Examples of task metrics include: completion times, error detection rates, other anomaly detection rates, equipment usage rates, and equipment fault detection rates. For example, the system may detect a start time of a task or operation and an end time of the task or operation. The system may store task or operation completion times. The system may compare the completion times to expected completion times based on the same user or other users. This system may provide to the user or to other entities efficiency metrics for a particular user, particular operations, or particular tasks based on the comparison.

Workspace metrics application platform 130 processes metrics generated by the task metrics recording engine 116 to perform additional functions associated with the workspace 120. For example, the workspace metrics application platform 130 may schedule a piece of operating equipment 121 for maintenance based on detecting a particular usage level or a particular error rate level associated with operations performed using the equipment 121. The workspace metrics application platform 130 may generate operator rankings based on completion times, error rates, or productivity metrics associated with one or more users.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 4, titled "Computer Networks and Cloud Networks."

In one or more embodiments, a data repository 150 is any type of storage unit and/or device (e.g., a file system, database, collection of tables, or any other storage mechanism) for storing data. Further, a data repository 150 may include multiple different storage units and/or devices. The multiple different storage units and/or devices may or may not be of the same type or located at the same physical site. Further, a data repository 150 may be implemented or may execute on the same computing system as the workspace monitoring platform 110. Alternatively, or additionally, a data repository 150 may be implemented or executed on a computing system separate from the workspace monitoring platform 110. A data repository 150 may be communicatively coupled to the workspace monitoring platform 110 via a direct connection or via a network.

Information describing mappings of actions to operations and operations to tasks may be implemented across any of components within the system 100. However, this information is illustrated within the data repository 150 for purposes of clarity and explanation.

In one or more embodiments, the workspace monitoring platform 110 refers to hardware and/or software configured to perform operations described herein for capturing images of user actions in a workspace and performing operations, such as presenting instructions to perform a next action, based on detected user actions. Examples of operations for presenting instructions for performing a series of operations based on detecting user actions in image data are described below with reference to FIG. 2.

In an embodiment, the workspace monitoring platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 117 refers to hardware and/or software configured to facilitate communications between a user and the workspace monitoring platform 110. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

3. Presenting User Task Operations Based on Detected User Actions

Figure 2:
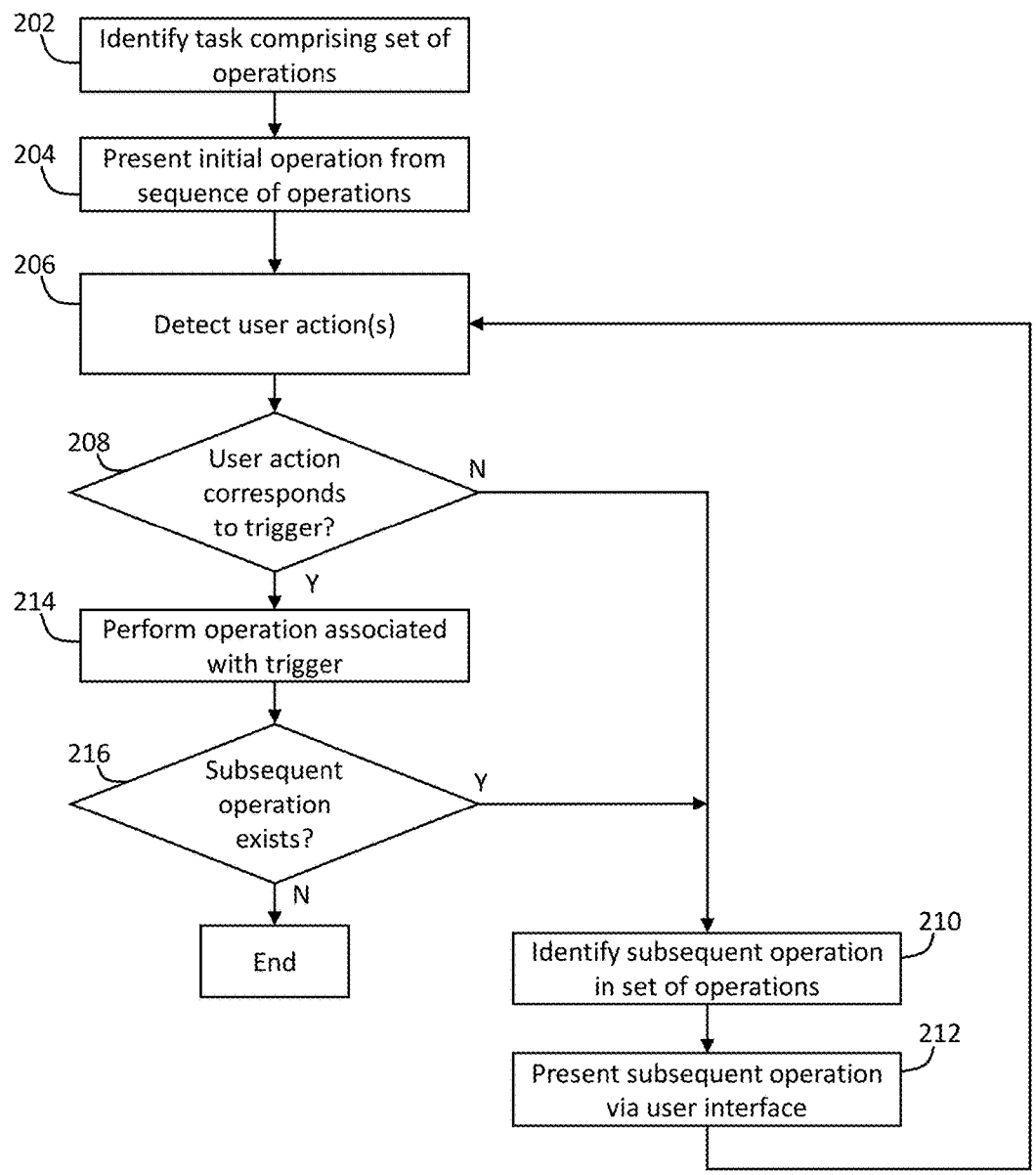
FIG. 2 illustrates an example set of operations for presenting user task operations based on detected user actions in accordance with one or more embodiments.

FIG. 2 illustrates an example set of operations for presenting user task operations based on detecting user actions in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system identifies a task made up of a set of operations (Operation 202). For example, a user may select a user interface icon associated with a task. Based on the user selection, the system identifies a set of operations to be performed by the user to complete the task. In addition, the set of operations may further include one or more operations to be performed by a machine or by another user. Alternatively, or in addition, the system may analyze image data of user actions, such as data recorded by a video recorder, to identify an action or set of actions performed by a user. For example, a user may interact with machine by selecting a component from a bin. The system may recognize the action as belonging to a task to "assemble device module." The task may include six operations, including an operation to select the component from the bin. According to one example embodiment, a workspace in a manufacturing facility includes one or more pieces of equipment. The system identifies the task made up of the set of operations based on detecting, in recorded video data, a user action in the workspace, such as a user interacting with a particular item of equipment.

According to an example embodiment, the system identifies the task based on detecting a pattern of user actions. For example, one task may include cleaning a sub-component. Another task may include assembling the sub-component into a component. The system may identify which task the user is initiating based on detecting a different pattern of user actions. Detecting cleaning the sub-component may include detecting the user placing an item on a surface and reaching for a cleaning agent. Detecting assembling the sub-component into a component may include detecting the user placing the item on the surface and reaching for another sub-component that makes up the component. The system may learn patterns associated with one or more actions that correspond to particular tasks.

The system presents via a user interface an operation in the set of operations that makes up the task (Operation 204). For example, in a set of ten operations, the system identifies the next operation to be performed in the set of ten operations. The set of operations may be arranged in a pre-defined sequence. Alternatively, the task may be completed by performing operations in multiple different sequences, or in any sequence. One or more operations may be optional for completing the task. Other operations may be required for completing the task. In an example in which a set of operations is required to be performed in a particular sequence, the system identifies the next operation in sequence and presents the next operation in the sequence. In an example in which multiple different operations may be performed next (e.g., either as the first operation in a task or as an operation subsequent to the operation corresponding to the identified user action), the system selects the operation to present based on predefined criteria. For example, the system may determine that performing the operations in one sequence may result in a better execution time than performing operations in another sequence. The system may present via the user interface an operation based on the sequence associated with the better execution time. The system may determine that resources required for one operation are available while resources required for another operation are not available. Similarly, the system may predict that performing operations in one sequence may result in a delay due to waiting for a resource—such as a machine or sub-component—to become available. If there is no clear time-based or resource-based criteria for selecting an operation to present, the system may select an operation randomly or semi-randomly. For example, the system may select an operation to present based on a memory address of files associated with display data for the operation, a number randomly assigned to operations, or an alphabetical order associated with a title of operations.

Presenting an operation may include displaying a photograph or graphic image of a piece of equipment or a component to be handled by a user, and an action to be performed by the user. For example, the system may display a photo of a piece of testing equipment, a sub-component placed at a particular location on the testing equipment, and a highlight icon for a button to be pressed to initiate a test of the sub-component. According to one example embodiment, presenting the operation include presenting a live video image of a component or piece of equipment. As the user interacts with the component or piece of equipment, the system may show the video image of the user's hand and the component or equipment together with a graphic image of an operation to be performed using the component or equipment.

The system detects performance of a user action (Operation 206). According to one example embodiment, the system detects performance of a user action based on image data of the user in a workspace. The image data may be obtained from one camera or multiple cameras. The system may detect performance of the user action based on image data in combination with additional data, such as sensor data detecting a change in weight in a bin containing sub-components, a piece of equipment powering up, or a change in temperature of a piece of equipment.

In one embodiment, the system presents, together with presenting an operation to be performed, a video image of a piece of equipment or sub-component associated with the operation. For example, the operation may include placing a sub-component within a container. The system may provide a video image of the container together with an icon representing placing a sub-component in the container. The user may observe via the video image of the container in the workspace that the user is performing the presented operation. When the user interacts with the container corresponding to the operation, the user can see the interaction in the displayed video image.

The system may detect the user action via an action-recognition application. According to one or more embodiments, the system trains a machine learning model to identify user actions. The system may train the machine learning model with a data set of images depicting positions of a user within a workspace. The images may include a user interacting with a particular component, such as a manufactured component, and with a particular piece of equipment. The system may train the machine learning model to identify different actions associated with the same components and the same pieces of equipment. As an example, one set of images depicting one user action may show the user pressing buttons on equipment to put the equipment at a desired setting. Another set of images depicting another user action may show the user moving a component to the piece of equipment. Yet another set of images depicting another user action may show the user interacting with a particular actuating mechanism to cause the equipment to modify the component, such as by soldering sub-components onto the component, for a particular duration of time. The system may train the machine learning model to identify the distinct sets of images that show the separate user actions.

The system matches the identified user actions to operations of one or more tasks. The machine learning model may be trained to match actions to task operations. Alternatively, the machine learning model may be trained to identify the actions, and a mapping engine may map actions and sets of actions to operations. For example, one operation—setting a piece of equipment to a particular setting—may be a part of three stored tasks. Each task may be associated with a different manufactured component. The system may identify a set of user actions as corresponding to a set of operations of a particular task by identifying (a) the particular operation associated with multiple tasks, and (b) another operation corresponding to a detected user action of handling a particular manufacturing component. The system may identify the combination of operations (a) and (b) as being associated with one particular task. If the user instead selects another manufacturing component (e.g., operation (c)), the system may identify the combination of operations (a) and (c) as being associated with a different particular task.

The system determines whether a detected user action corresponds to system operation trigger (Operation 208). In an example embodiment in which the task is made up of a set of operations that are performed in a specified sequence, the system may determine that (a) the user selected the task for performance or began performance of the task and (b) the user performed an operation within the set of operations that make up the task, but out of sequence. According to another example, the system may determine that the user performed an operation incorrectly. The system may detect a variation in the user's action from a specified action corresponding to an operation. Alternatively, the system may detect an anomalous state of a piece of equipment or a manufactured component.

According to yet another example, the system may determine that the user performed an action that was not included in a set of actions corresponding to a task. According to yet another example, the system may determine that the user completed the last operation of a particular task. According to yet another example, the system may determine that multiple possible operations may be performed subsequently to the previously performed operation.

If the system determines that the user action does not correspond to system operation trigger, the system identifies one or more subsequent operations of the particular task (Operation 210). For example, if the observed user action corresponds to an operation that is one of a sequence of operations in a task, the system identifies the next operation in the sequence of operations. According to another example, the observed user action may correspond to a task operation that is one of a set of operations that are not associated with any particular sequence. For example, the task may include operations A, B, and C which may be completed in any order. When operations are not associated with any particular sequence, the system may select an operation to be the subsequent operation based on one or more performance criteria.

For example, the system may calculate which sequence of operations meets a particular performance threshold such as: likelihood of success of task performance, or the shortest time to complete a task. According to another example, the system may select an operation as the subsequent operation based on analyzing past performance of the task to identify which operation was most often selected by the user, or other users, as the subsequent operation. According to yet another example, the system may select an operation as the subsequent operation based on analyzing one or both of equipment status and manufacturing component status. For example, if a particular piece of equipment is in use by another user, the system may refrain from selecting an operation requiring the piece of equipment as the subsequent operation. If a piece of equipment requires a warm-up time, the system may select an operation to initiate warming-up of the equipment so that another operation may be performed while the equipment warms up. According to another example, if a particular manufacturing component is temporarily low or out of stock, the system may refrain from selecting a particular operation requiring the manufacturing component as the subsequent operation.

The system presents the subsequent operation to the user via a user interface (Operation 212). According to one example, the system presents the subsequent operation to the user without any intervening instructions from the user. For example, the user does not need to press a button or icon to advance a display of the user interface from one operation to the next. Instead, the system automatically advances the display from one operation to the subsequent operation based on observing user actions via an image capture device and identifying the operations and tasks associated with the user actions. According to one or more embodiments, the user actions are not user actions interacting with the user interface. Instead, they are actions interacting with equipment and/or components in a workspace.

According to one embodiment, the system presents the subsequent operation via the user interface by displaying instructions for completing the next operation. For example, the system may display via the user interface icons representing a user's body performing a particular action associated with a particular piece of equipment and/or a particular manufacturing component. In addition, or in the alternative, the system may display text instructions for performing user actions corresponding to the subsequent operation. In addition, or in the alternative, the system may present instructions for performing user actions corresponding to the subsequent operation via voice or audio transmission.

According to one or more embodiments, the presentation of the subsequent operation may include a depiction of a component to be manipulated by the user during the operation. The depiction may show how a component is to be modified. The depiction may show a final state of the component after being modified.

According to one or more embodiments, the system presents the subsequent operation based on determining that the previous operation was completed by the user. For example, the system may observe by the user's body position that an action has been completed. In addition, or in the alternative, the system may obtain status data from a piece of equipment indicating that an action performed by a user has resulted in the equipment obtaining a particular state (such as powered-up, test completed, manufacturing operation completed, etc.) Alternatively, the system may identify a state of a component operated on by the user. The system may scan the component to determine that a modification has been performed by the user. For example, the system may identify via video analysis that component A has been attached to component B. As another example, the system may detect a change in weight in a work surface, indicating the presence of component A on the work surface.

According to an alternative embodiment, the system may present the subsequent operation based on determining that the previous operation was initiated by the user. According to one or more embodiments, the system may present the subsequent operation based on detecting a particular state of a manufactured component, resource for manufacturing the component, or a state of a piece of equipment in a workspace.

If the system determines that the user action identified in Operation 206 corresponds to a system operation trigger, the system performs an operation associated with the trigger (Operation 214). For example, if the system detects that the user action identified in Operation 206 was the last operation of a task, the system may perform one or more operations association with completion of the task, such as: recording a time taken by the user to complete the task, recording any errors or anomalies detected during the user's performance of the task, recording the completion of the task in a task management system (which may trigger in another user's interface an option to perform a dependent task), and identifying a next task to be performed by the user. As an example, the system may identify a pattern of tasks typically performed by a user. Upon completion of one task in the pattern, the system may display on a user interface an operation initiating another task in the pattern of tasks.

Another system operation trigger includes determining the user performed an operation out of sequence. In response, the system may (a) recommend aborting the task, (b) recommend restarting the task. (c) generate a notification on the user interface that the detected operation is out of sequence, or (d) prompt the user to indicate whether to generate a new sequence of operations for the task based on the user's current sequence for performing the operations. The system may select from among system operations (a)-(d), above, based on one or both of previously-generated rules or detected characteristics of the task. For example, if the system determines a task includes sequential operations A, B, C, and D, and the system detects the user performing operation C prior to operation B, the user may further determine that such a change in sequence will result in a manufactured component being manufactured incorrectly. Accordingly, the system may determine that the sequence cannot be re-arranged and the system operation must include a prompt to abort and restart the task. Alternatively, if the system determines that the task includes sequential operations A, B, C, and D, but performing the operations out of order would not result in a known flaw in a manufactured component, the system may prompt the user to indicate whether to store a new sequence for performing the operations.

Another system operation trigger includes detecting that the performed user action does not match a user action associated with a particular operation, such as a presently-displayed operation. For example, the system may detect via imaging sensors that a user moved an actuator of a piece of equipment 45 degrees, but the operation specifies moving the actuator 90 degrees. The system may (a) recommend aborting the task. (b) recommend repeating the operation, (c) recommend restarting the task. (d) generate a notification on the user interface that the detected user action did not correspond to the displayed user action, or (d) prompt the user to indicate whether to modify the stored set of actions for the operation to correspond to the presently-detected user action. The system may select from among system operations (a)-(d), above, based on one or both of previously-generated rules or detected characteristics of the task and/or operation.

Another system operation trigger includes detecting a status of a piece of equipment or resource associated with a task. For example, the system may detect that a piece of equipment is in an error state. Alternatively, the system may detect that the equipment is not in an error state, but is not in a state specified for a particular task. The system may perform a system operation recommending aborting or restarting an operation or task, or performing one or more intervening operations to place the equipment in a state specified for the task prior to continuing with operations specified in the task. In addition, or in the alternative, the system may detect an anomalous state of a manufactured component associated with a task and/or operation. An operation may include the user action of placing the component in an analysis device, such as a scanner. Based on detecting an anomaly in the component, the system may recommend aborting or restarting the task or operation. Alternatively, the system may display one or more recommended operations for correcting a detected anomaly. For example, if the anomaly includes a tube being fastened to a flange, the system may recommend an operation to tighten a fastening device prior to proceeding with operations for manufacturing the component.

Another system operation trigger includes determining that multiple possible operations may be performed subsequently to the previously performed operation. For example, three different tasks may begin with operations A and B. The system may prompt a user to select which task, from among the three tasks, the user is performing to allow the system to recommend an appropriate subsequent operation for the task. The prompt may be presented via a touch interface and/or an audio interface, for example.

According to one or more embodiments, performing an action associated with a trigger includes altering a state of a piece of equipment, without user intervention, in response to detecting the user action. For example, the system may detect a user action to obtain a component A from bin A. The system may, without user intervention, illuminate a light on bin B corresponding to a next action to be performed (e.g., selecting component B from bin B). Alternatively, the system may determine that selecting component A was an action performed out of sequence. Accordingly, the system may illuminate one light on bin A (such as a red light) and another light on bin B (e.g., a green light) to prompt the user to correct a sequence of operations. The system may initiate a warm-up sequence for a piece of equipment associated with a next action in a sequence of actions. According to another example, the system may cause a piece of equipment to initiate a scan of a component responsive to detecting a user action placing a component in the piece of equipment.

Upon performing the system operation associated with a system operation trigger, the system determines if a subsequent operation exists (Operation 216). For example, a system operation may include generating a notification to a user or a prompt for user input. Upon receiving the notification or responding to the prompt, the user may still continue to perform operations associated with a task. Accordingly, the workflow proceeds to Operation 208. In contrast, a system operation may include terminating a task.

If the system determines that the detected operation was the last operation in a task, the system may refrain from displaying information about any next operation. The system may, for example, generate a user interface element indicating a task has been completed. If the system determines that a detected fault or anomaly makes performance of the task impossible or unsatisfactory, the system may refrain from displaying additional operation information. The system may generate a user interface element prompting the user to restart the task, initiate a new task, or obtain assistance from another operator. The additional operator may be in a different workspace from the operator being monitored by workspace monitoring platform 110. For example, the additional operator may be in an adjacent workspace or may be a supervisor of the monitored operator. According to one example, embodiment, the system monitors multiple different operators in different workspaces or in a same workspace. For example, two operators may operate within a same workspace to assemble a product. The system may monitor the actions of each operator independently. As another example, the system may monitor actions of operators in two separate workspaces. The system may generate a notification to an additional operator based on a state of the operator—such as if the operator is at rest between tasks or operations.

3.1 Initiating Branching Tasks

According to one or more embodiments, the system initiates a branching task off of a main task being performed by a user. For example, the system may detect a user action that varies from a displayed action for a particular operation. Based on detecting the variation of the user action from the displayed user action, the system may initiate the branching task. For example, a main task may include operations A, B, and C. The system may detect a user performing an operation D instead of operation B. The system may initiate a branching task prompting the user to perform operations D1 and D2. The system may then return to the main task by prompting the user to perform operation C.

As an example, operation D may include the user pressing one button on a machine instead of another button specified for a task. Operations D1 and D2 may correspond to user actions interacting with the machine to place the machine in a state ready for performance of operation C. According to an alternative example, operations D1 and D2 may include instructional videos illustrating how to perform operation B. The system may then prompt the user to repeat operation B or restart the task.

According to another example, a user may initiate a task including operations A, B, C, and D, to be performed in sequence. Subsequent to performing operation B, the system displays on a user interface a graphic representation associated with operation C. The user may be assigned an urgent task by a supervisor. Accordingly, the system detects the user performing operation E, associated with the urgent task. The system may determine whether (a) the first operation must be aborted, or (b) whether to store the user's progress in the first task for completion at a later time. For example, the system may determine that operation E is part of a sequence of operations E, F. B. G. If operation B requires the same equipment in both tasks, the system may abort the first task to allow the user to access the equipment in the second task. Alternatively, the system may determine that the new task does not conflict with the initial task. Accordingly, the system may display operations for the new task as a branching task from the initial task. The system may then resume the prompting the user to perform operations for the initial task by returning to display a graphic associated with operation C of the initial task upon detecting completion of operation G by the user.

3.2 Triggering Recording of Statistics Associated with Tasks

According to one or more embodiments, performance of operations and tasks causes the system to record statistics associated with the operations and tasks. The statistics may include for example recording resources consumed to perform an operation or task. These statistics may further include, for example, recording a number of components manufactured as a result of completion of tasks. According to another example, the system records usage statistics for machinery used to perform operations and tasks. For example, the system may track how long a piece of machinery operates to perform operations and tasks. The usage information may be fed into a maintenance log for scheduling maintenance of equipment.

According to one or more embodiments, the system uses task statistics to generate and/or modify schedules for performance of future tasks and/or operations. For example, the system may use task metrics associated with one or more tasks to: compute future delays and their production line, plan for ramping up resources at a particular time in the future, predict a completion time of future tasks, and predict a completion time of a project that depends on one or more tasks.

3.3 Monitoring Task Metrics Based on Detected User Actions

According to one or more embodiments, a system generates task metrics based on detected user actions. Examples of task metrics include: completion times, error detection rates, other anomaly detection rates, equipment usage rates, and equipment fault detection rates. For example, the system may detect a start time of a task or operation and an end time of the task or operation. The system may store task or operation completion times. The system may compare the completion times to expected completion times based on the same user or other users. The system may provide to the user or to other entities efficiency metrics for a particular user, particular operations, or particular tasks based on the comparison. For example, the system may generate task completion ratings for a set of operators performing the same tasks.

4. Machine Learning Model Training

Figure 3:
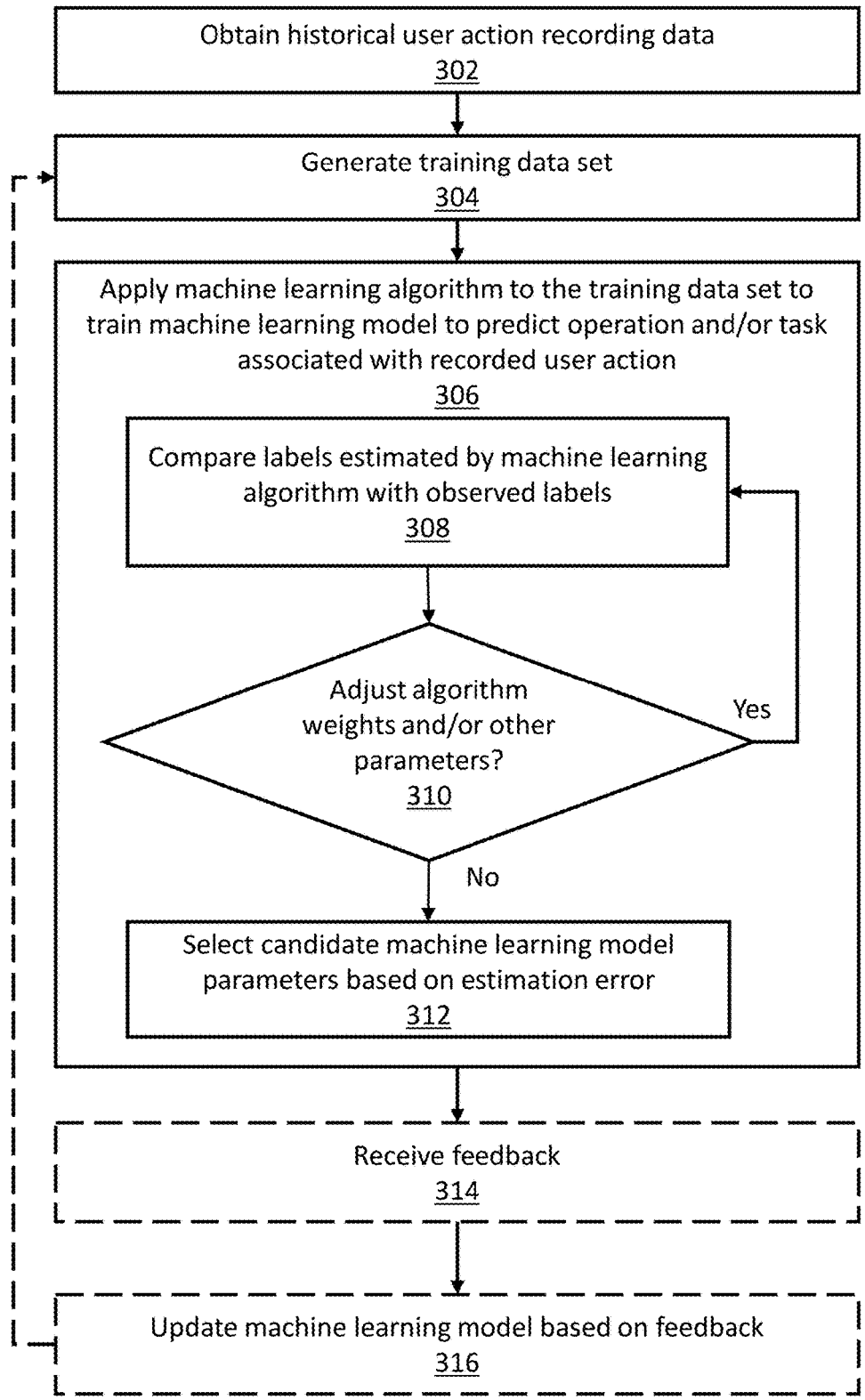
FIG. 3 illustrates an example set of operations for training a machine learning model to classify recorded user actions as operations associated with tasks in accordance with one or more embodiments.

FIG. 3 illustrates an example set of operations for training a machine learning model classify patterns of user actions as corresponding to operations and/or tasks in accordance with one or more embodiments. Classifying the user actions may include a classification as (a) corresponding to a particular task, and/or (b) corresponding to a particular operation. According to one embodiment, the system also assigns a confidence level to a prediction. Based on one user action, the system may assign a low confidence level to a particular classification as corresponding to a particular task. Based on two or more user actions performed in sequence, the system may assign a higher confidence level to a particular classification for a particular user action.

The method includes identifying or obtaining historical video image data (Operation 302). Obtaining the historical data may include obtaining data associated with user positions within a workspace. For example, a set of image data may include a user interacting with a piece of equipment, a component, or another user within a workspace. The historical data may be associated with other data, such as equipment status data (e.g., whether a particular machine is turned on or at a particular state at a time when a particular set of image data was captured). The historical image data may include both real image data (e.g., captured by a video camera) and synthetic image data (e.g., data generated by a computer to mimic video data).

The system uses the historical video data to generate sets of training data (Operation 304). The set of training data includes video data of a recorded user action and a label identifying an operation and/or task associated with the recorded user action. The set of training data may include additional attributes associated with the video data including: an identity of a user, a position of a user within an organization, a previous operation and/or task performed by the user prior to the recorded action, a location of a workspace in which the user is operating, equipment data, such as a status (e.g., powered-up, powered-down, ready for operation, cooling down from operation, performing operation) of a machine in the workspace. A training label may include an identifiers of a an operation (e.g., sub-process of a task made up of operations) associated with an action (e.g., "Operation: connect Component A to Component B") and/or an identifier of a task associated with the action and/or the corresponding operation (e.g., "Operation: Connect Component A to Component B; Task: Assemble Component XYZ."

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include an identity of a user, a position of a user within an organization, a previous operation and/or task performed by the user prior to the recorded action, a location of a workspace in which the user is operating, equipment data, such as a status of a piece of equipment in a workspace. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a type of healthcare service has ten different categories, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set to train the machine learning model (Operation 306). The machine learning algorithm analyzes the training data set to train neurons of a neural network with particular weights and offsets to associate particular recorded user actions with particular operations and/or tasks. According to one or more embodiments, the machine learning algorithm or a post-machine-learning algorithm further assigns a confidence score to a prediction. For example, training the machine learning model may result in identifying a relationship between one user action and a particular operation that is a part of three different tasks. Training the machine learning model may further result in determining that when the operation is performed subsequent to completion of Task A, the operation is most likely associated with an operation in Task B. Training the machine learning model may further result in determining that when the operation is performed subsequent to completion of Task C, the operation is most likely associated with an operation in Task D. Accordingly, if the machine learning model determines that the operation identified in the recorded user action was performed subsequent to Task C, the operation is likely operation P in Task D with an 80% confidence level.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data. In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different recorded user actions. For example, a recorded user action in isolation may have a first set of weights applied by nodes as a function of the respective feature vector for the expense. However, if the recorded user action is immediately preceded by another type of recorded user action associated with an operation in a particular task, then a different set of weights may be applied by one or more nodes based on the memory of the preceding recorded user action. In this case, the operation prediction assigned to the second recorded user action may be affected by the first recorded user action. Additionally, or alternatively, the system may generate and train other candidate models, such as support vector machines, decision trees, Bayes classifiers, and/or fuzzy logic models, as previously described.

In some embodiments, the system compares the labels estimated through the one or more iterations of the machine learning model algorithm with observed labels to determine an estimation error (Operation 308). The system may perform this comparison for a test set of examples, which may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether to adjust the weights and/or other model parameters based on the estimation error (Operation 310). Adjustments may be made until a candidate model that minimizes the estimation error or otherwise achieves a threshold level of estimation error is identified. The process may return to Operation 308 to make adjustments and continue training the machine learning model.

In some embodiments, the system selects machine learning model parameters based on the estimation error meeting a threshold accuracy level (Operation 312). For example, the system may select a set of parameter values for a machine learning model based on determining that the trained model has an accuracy level for predicting labels of operation and/or tasks for recorded user actions of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include a sequence of related recorded user actions. Each recorded user action may be processed as a separate discrete instance of time. For instance, an example may include recorded user actions $c_1$, $c_2$, and $c_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous recorded user actions in the sequence of recorded user actions. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one recorded user action to a cell's output may affect the contribution of the next recorded user action in the cell's output. Thus, the contribution of $c_1$ may affect the contribution of $c_2$, etc.

Additionally, or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of recorded user actions.

In embodiments in which the machine learning algorithm is a supervised machine learning algorithm, the system may optionally obtain feedback on the various aspects of the analysis described above (Operation 314). For example, the feedback may affirm or revise labels generated by the machine learning model. The machine learning model may indicate that a particular recorded user action is associated with a label to "connect Component A to Component B." The system may receive feedback indicating that the particular recorded user action should instead be associated with a label to "disconnect Component A from Component B." Based on the feedback, the machine learning training set may be updated, thereby improving its analytical accuracy (Operation 316). Once updated, the system may further train the machine learning model by optionally applying the model to additional training data sets.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
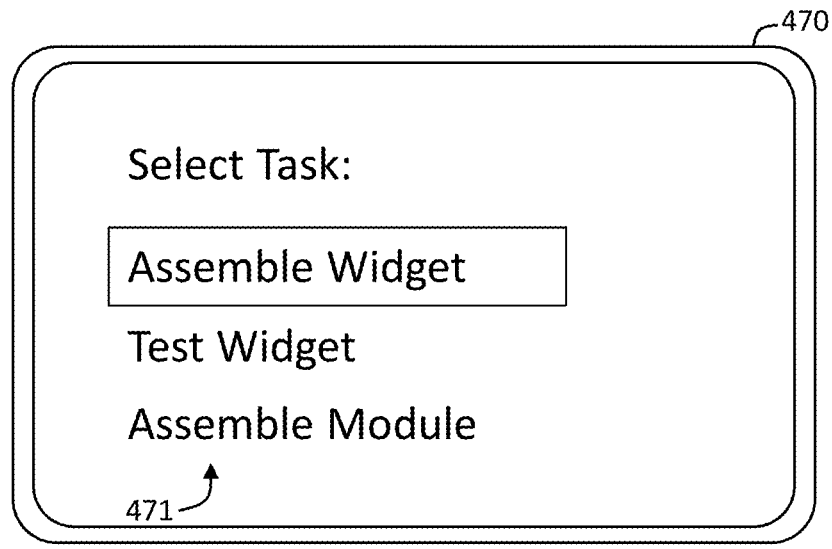
FIGS. 4A-4F illustrate an example embodiment.

FIG. 4A illustrates a user interface display 470 displaying a set of tasks 471 that may be performed at a workstation. For example, a workstation management system may detect the presence of a particular user and display a set of tasks that may be performed by the particular user at the workstation. Based on user selection of the task "Assemble Widget," represented by a box around the task name in FIG. 4A, the system displays a set of operations 472 to be performed to complete the task, as illustrated in FIG. 4B.

Figure 4B:
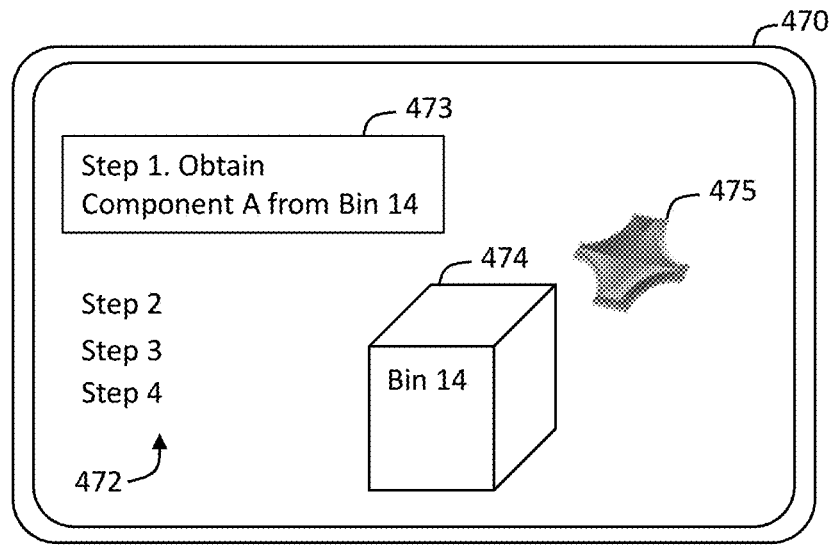

FIG. 4B illustrates the set of operations 472 and a presently-displayed operation 473 "Obtain Component A from Bin 14." The system further displays a depiction of Bin 14, reference number 474, and a depiction of the Component A, reference number 475.

Figure 4C:
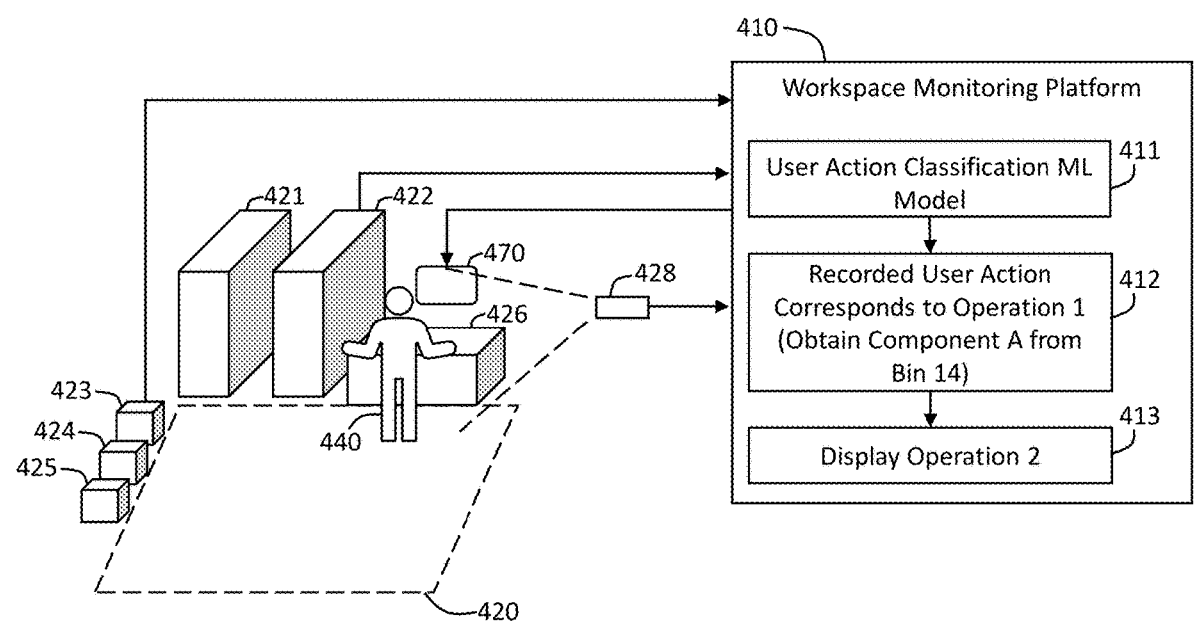

Referring to FIG. 4C, the system detects a user action via a video camera 428. A workspace 420 is monitored by camera 428. Camera 428 monitors user actions of the user 440 in the workspace 420. The workspace 420 also includes equipment 421 and 422, a work surface 426, and the display device 470. The workspace monitoring platform 410 obtains camera data and status data from equipment 421 and 422 to detect user actions. For example, the system detects a user action of moving to bin 424 and from bin 424 to work surface 426. The system also detects a change in weight of the bin 424. The system provides the video and sensor data to the user action classification machine learning model 411. The model 411 determines that the user action corresponds to a first operation of a task (e.g., "Step 1: Obtain Component A from Bin 14") (Operation 412). Responsive to identifying the user action as corresponding to the first operation in the task, the system displays the next operation in the task (e.g., "Operation 2") on the display device 470 (Operation 413).

Figure 4D:
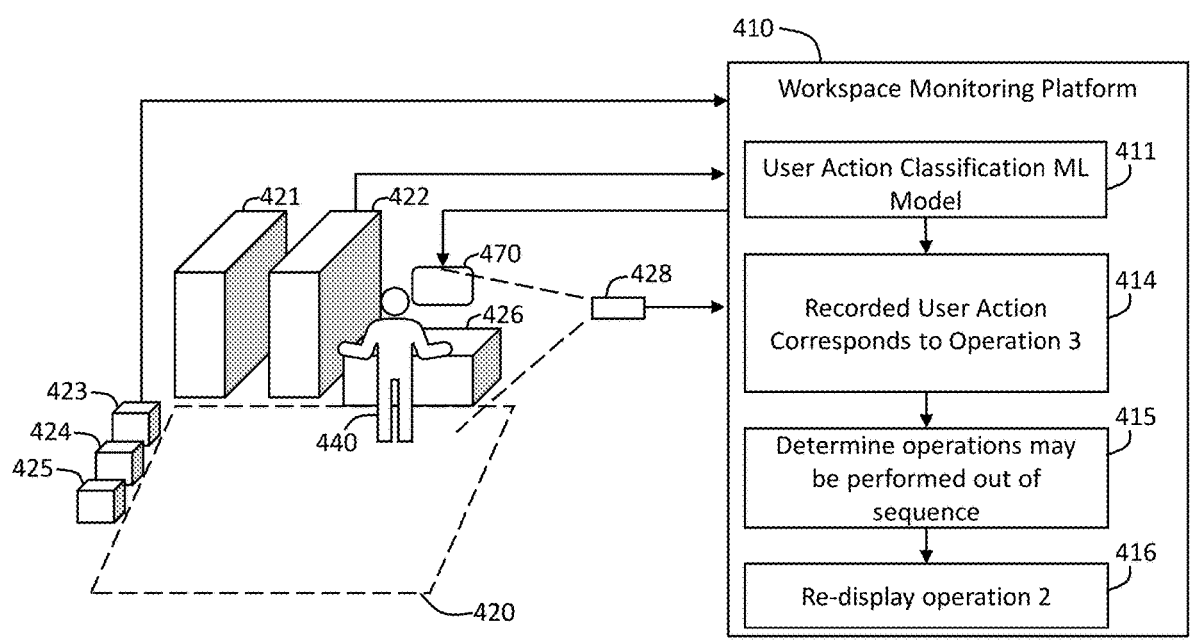

Referring to FIG. 4D, the system detects a next user action via a video camera 428. The workspace monitoring platform 410 provides the video and sensor data to the user action classification machine learning model 411. The model 411 determines that the user action corresponds to Operation 3 of the task, and not the displayed actions associated with Operation 2 of the task (Operation 414). Responsive to identifying the user action as corresponding to the third operation in a task, the system determines whether the operations that make up the task may be performed out of sequence. Based on determining the operations of the task may be performed out of sequence (Operation 415), the system identifies the next operation to display. The system determines that the second operation, Operation 2, should be performed next and re-displays on the display device 470 user actions associated with the second operation (Operation 416).

Figure 4E:
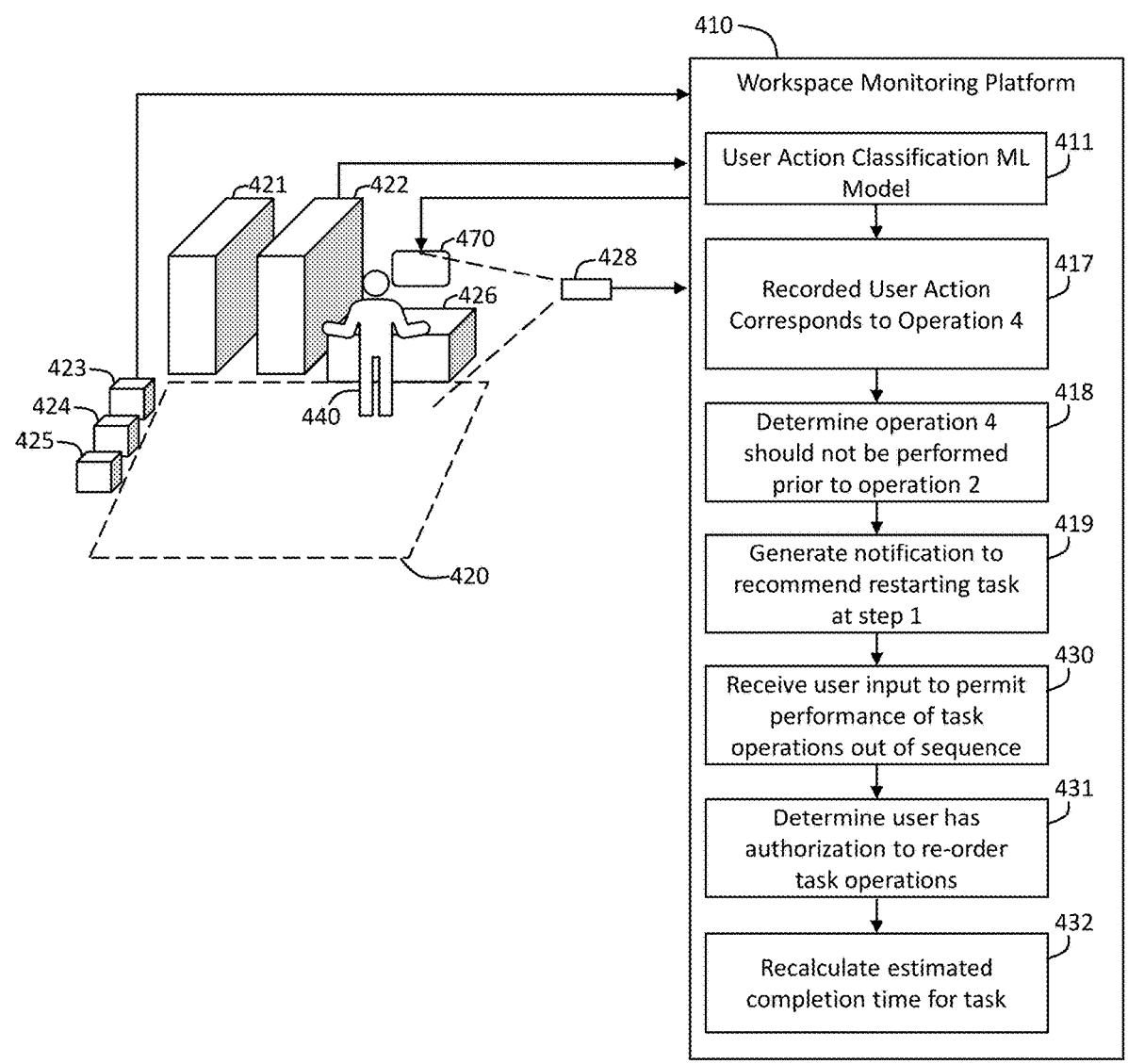

Referring to FIG. 4E, the system detects a next user action via a video camera 428. The workspace monitoring platform 410 provides the video and sensor data to the user action classification machine learning model 411. The model 411 determines that the user action corresponds to Operation 4 of the task, and not the displayed actions associated with Operation 2 of the task (Operation 417). Responsive to identifying the user action as corresponding to the fourth operation in the task, the system determines whether the fourth operation in the task may be performed prior to the second operation in the task. The system determines that the fourth operation should not be performed prior to the second operation (Operation 418). For example, the system may compare a completion time associated with performance of the operations in a particular sequence to a threshold completion time for the task. The system determines that performing operation 4 prior to operation 2 results in a task completion time that exceeds a threshold. Based on determining that operation 4 should not be performed prior to operation 2 in the task, the system displays a notification on the display device 470 recommending that the user restart the task (Operation 419). The system receives via a user interface a user input directing the system to allow the operations of the task to be performed out of sequence (Operation 430). The system determines (a) whether the user has authorization to reorder steps in a task, and (b) whether the task is capable of being completed in a different order than a stored sequence. For example, in the particular task being performed, some steps may be stored in a particular sequence and other steps may be stored without any particular sequence. Accordingly, operation 4 may be stored with a dependency from operation 2, but operation 3 may be stored without any dependencies. Accordingly, operation 3 may be identifying by the system as being capable of being performed in any sequence. Based on determining (a) the user has authority to modify a dependency in a task to change the sequence in which task operations are performed, and (b) the task is capable of being performed in the modified sequence, the system allows the user to re-order the sequence of operations to perform the task (Operation 431). The system recalculates an estimated completion time for completing the task based on the reordered sequence (Operation 432). The system may notify a downstream process—such as a workflow management system that manages the manufacturing of components that use the particular component being manufactured by the user 440—of the updated estimated completion time.

Figure 4F:
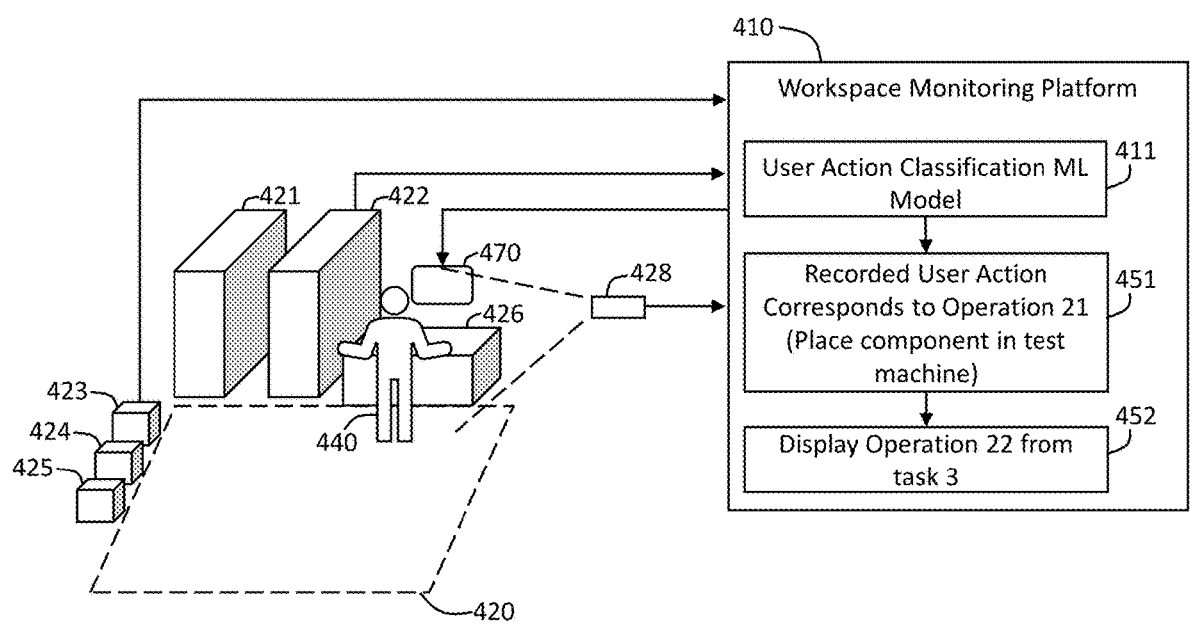

Referring to FIG. 4F, the system may detect a user action even when no task has been selected by a user. The system detects a user action via a video camera 428. The workspace monitoring platform 410 provides the video and sensor data to the user action classification machine learning model 411. The model 411 determines that the user action corresponds to Operation 21 of a task ("Place component in test machine 422) (Operation 451). The system identifies a set of three tasks that include Operation 21. The system further identifies the task most likely being performed by the user 440. For example, the three tasks including Operation 21 include operations that may be performed in any sequence. However, the ML model 411 learned via training that the user has only performed Operation 21 at the beginning of a sequence of operations when performing Task 3. Accordingly, the system (a) determines a sequence for displaying operations of Task 3, and (b) displays via the display device 470 a user action associated with a next operation (e.g., Operation 22) to be performed in Task 3 (Operation 452).

6. Computer Networks and Cloud Networks

In one or more embodiments, a workspace monitoring system is implemented in a computer network. A computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a user may access a workspace monitoring platform via a client. A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As A an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
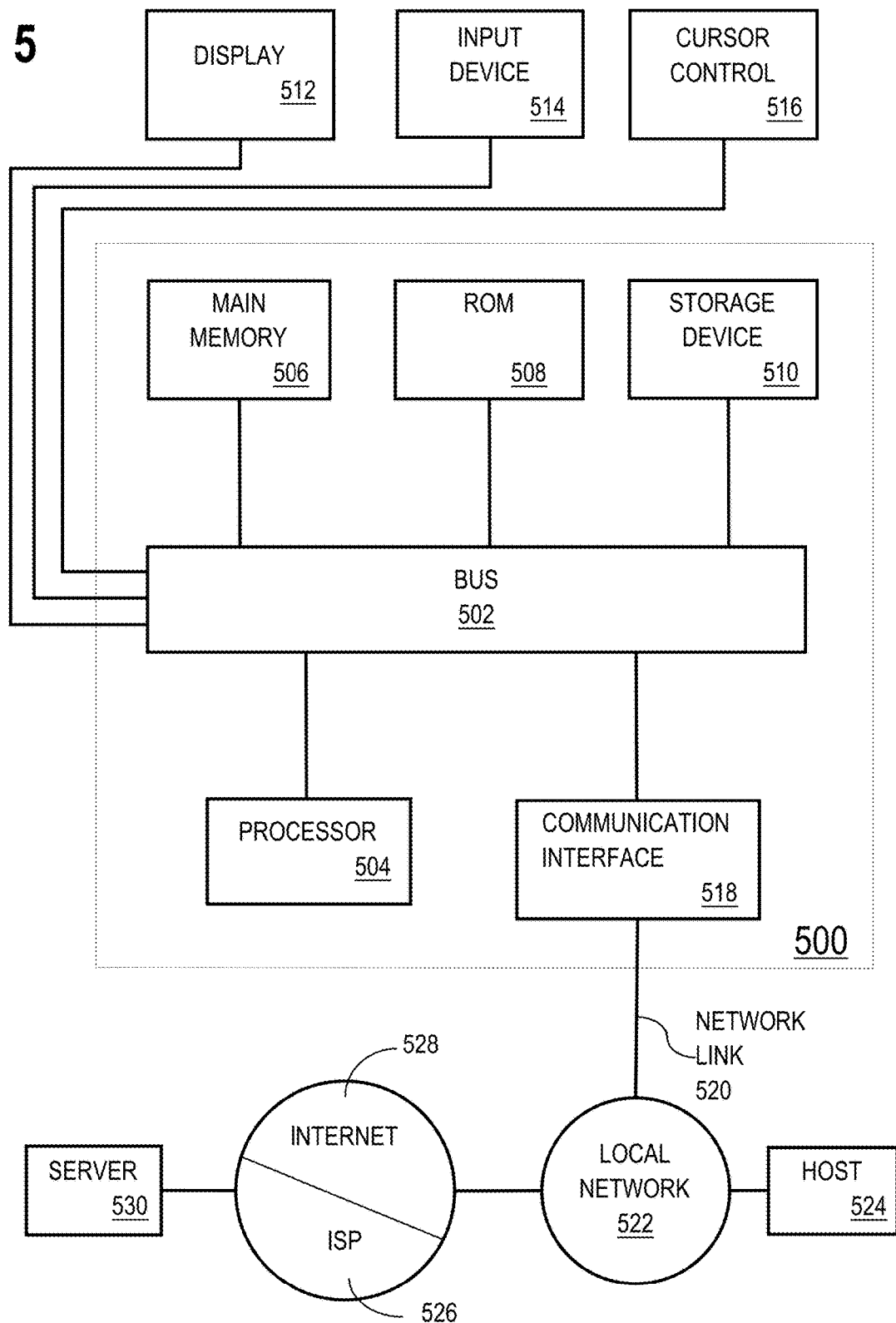
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   presenting, by a workspace monitoring platform in a user interface device, a first instruction, associated with a first operation in a set of operations for performing a first task, for a user to perform the first operation;
   concurrently with presenting the first instruction:
      capturing, by one or more sensors in a workspace monitoring platform, sensor data, wherein the one or more sensors include an image capture device; and
      receiving a video stream from the image capture device that is based on the sensor data;
   analyzing, by the workspace monitoring platform, the video stream, in real-time as the video stream is received from the image capture device, to detect a first set of one or more actions performed by the user;
   determining, by the workspace monitoring platform, whether the first set of actions correspond to completion of the first operation associated with the first instruction that is currently being presented; and
   responsive to determining, by the workspace monitoring platform, that the first set of actions correspond to the completion of the first operation:
      identifying, by the workspace monitoring platform, a second operation that is subsequent to the first operation in the set of operations for performing the first task; and
      presenting, by the workspace monitoring platform in the user interface device, a second instruction, corresponding to the second operation, for the user to perform the second operation.

2. The non-transitory computer readable medium of claim 1, wherein the operations further comprise:
   concurrently with presenting the second instruction: analyzing the video stream, in real-time as the video stream is received, to detect a second set of one or more actions performed by the user;

determining whether the second set of actions correspond to the second operation associated with the second instruction that is currently being presented; and responsive to determining that the second set of actions correspond to the second operation:

determining that the user has begun executing the second operation.

3. The non-transitory computer readable medium of claim 2, wherein the operations further comprise:

responsive to determining that the user has begun executing the second operation, presenting a third instruction, associated with a third operation in the set of operations, to perform the third operation.

4. The non-transitory computer readable medium of claim 2, wherein the operations further comprise:

responsive to determining that the second set of actions correspond to the second operation:

detecting a starting time for execution of the second operation.

5. The non-transitory computer readable medium of claim 4, wherein the operations further comprise:

determining scheduling-related information based on the starting time for execution of the second operation.

6. The non-transitory computer readable medium of claim 5, wherein determining the scheduling-related information comprises at least one of:

computing future delays in a workflow, planning for ramp-up of resources at a particular time, and prediction of a completion time of one or both of the second operation and a task including the second operation.

7. The non-transitory computer readable medium of claim 4, wherein the operations further comprise:

detecting an end time for execution of the second operation; and computing total time to complete the second operation based on the starting time and the end time.

8. The non-transitory computer readable medium of claim 1, wherein the operations further comprise:

concurrently with presenting the second instruction: analyzing the video stream, in real-time as the video stream is received, to detect a second set of one or more actions performed by the user;

determining whether the second set of actions correspond to completion of the second operation associated with the second instruction that is currently being presented;

responsive to determining that the second set of actions corresponds to a third operation that is different than the second operation:

determining that the second set of actions are out of sequence; and presenting a notification based on the second set of actions being out of sequence.

9. The non-transitory computer readable medium of claim 1, wherein the operations further comprise:

concurrently with presenting the second instruction: analyzing the video stream, in real-time as the video stream is received, to detect a second set of one or more actions performed by the user;

determining whether the second set of actions correspond to completion of the second operation associated with the second instruction that is currently being presented; and responsive to determining that the second set of actions corresponds to a third operation that is different than the second operation in the set of operations:

modifying a sequence of the set of operations to present instructions corresponding to the third operation prior to presenting instructions corresponding to the second operation.

10. The non-transitory computer readable medium of claim 1, wherein the operations further comprise:

identifying a task to be completed; and determining the set of operations based on the task to be completed.

11. The non-transitory computer readable medium of claim 1, wherein the operations further comprise:

analyzing the video stream, in real-time as the video stream is received, to detect performance of a particular action; and responsive to detecting the particular action, executing an operation to capture system data.

12. The non-transitory computer readable medium of claim 1, generating, by a machine-learning model, a sequence for performing the set of operations including the first operation based on a task completion metric associated with performing the set of operations in an order corresponding to the sequence.

13. The non-transitory computer readable medium of claim 1, wherein the operations further comprise:

identifying a task including the first operation, the second operation, and a third operation ordered subsequent to the second operation;

concurrently with presenting the second instruction: analyzing the video stream, in real-time as the video stream is received, to detect a second set of one or more actions performed by the user;

determining whether the second set of actions correspond to completion of the second operation associated with the second instruction that is currently being presented;

determining that the second set of actions correspond to a trigger criterion;

based on determining the second set of actions correspond to the trigger criterion, performing a trigger operations, comprising at least one of:

presenting a remedial instruction different from the third operation; and presenting a prompt to receive user input regarding modifying the task to include a fourth operation including the second set of actions.

14. The non-transitory computer readable medium of claim 1, wherein the operations further comprise:

concurrently with presenting the second instruction: analyzing the video stream, in real-time as the video stream is received, to detect a second set of one or more actions performed by the user;

determining whether the second set of actions correspond to completion of the second operation associated with the second instruction that is currently being presented; and responsive to determining that: (a) the second set of actions corresponds to completion of the second operation and (b) the second set of actions does not correspond to actions specified in the second instruction:

modifying the second instruction to include the second set of actions.

15. The non-transitory computer readable medium of claim 1, wherein the operations further comprise:

responsive to determining that the first set of actions correspond to the completion of the first operation:

updating a task profile associated with the set of operations to indicate the first operation has been completed.

16. The non-transitory computer readable medium of claim 1, wherein the operations further comprise:
calculating estimated completion times for different orders of executing the set of operations; and
selecting a particular order for presenting the instructions corresponding to the set of operations based on the estimated completion times.

17. The non-transitory computer readable medium of claim 1, wherein the set of operations specifies a sequence for ordering operations in the set of operations, and wherein the second operation is determined based on the sequence.

18. The non-transitory computer readable medium of claim 1, wherein presenting the second instruction is performed without user input requesting a switch from presenting the first instruction to presenting the second instruction.

19. The non-transitory computer readable medium of claim 1, wherein the operations further comprise:
responsive to determining that the first set of actions correspond to the completion of the first operation:
updating in a datastore a value representing at least one component consumed during performance of the first operation.

20. The non-transitory computer readable medium of claim 1, wherein the operations further comprise:
responsive to determining that the first set of actions correspond to the completion of the first operation:
detecting, by at least one sensor, an amount of consumable resources available for performance of the set of operations in a subsequent instance of performing the set of operations.

21. The non-transitory computer readable medium of claim 1, wherein analyzing the video stream to detect the first set of one or more actions performed by the user includes inputting video data generated based on the video stream to a machine learning model trained to identify user actions in video content.

22. The non-transitory computer readable medium of claim 21, wherein the operations further comprise:
training the machine learning model to classify user actions based on video data, at least by:
obtaining a training data set of images representing individuals interacting components and equipment; and
iteratively applying a machine learning algorithm to images of the training data set to adjust parameters, including weights and offsets, of the machine learning model.

23. The non-transitory computer readable medium of claim 22, wherein the machine learning model is further trained to identify tasks associated with sets of user actions based on identifying patterns in the sets of user actions.

24. The non-transitory computer readable medium of claim 1, wherein the operations further comprise:
subsequent to presenting the second instruction, analyzing, by the workspace monitoring platform, the video stream to detect a second set of one or more actions performed by the user;
detecting, by the workspace monitoring platform, an anomaly based on a difference between the second instruction and the second set of one or more actions; and
changing a set of displayed instructions from the second instruction to a third instruction to remediate the anomaly associated with the second set of one or more actions.

25. A method comprising:
presenting, by a workspace monitoring platform in a user interface device, a first instruction, associated with a first operation in a set of operations for performing a first task, for a user to perform the first operation;
concurrently with presenting the first instruction:
capturing, by one or more sensors in a workspace monitoring platform, sensor data, wherein the one or more sensors include an image capture device; and
receiving a video stream from the image capture device that is based on the sensor data;
analyzing, by the workspace monitoring platform, the video stream, in real-time as the video stream is received from the image capture device, to detect a first set of one or more actions performed by the user;
determining, by the workspace monitoring platform, whether the first set of actions correspond to completion of the first operation associated with the first instruction that is currently being presented; and
responsive to determining, by the workspace monitoring platform, that the first set of actions correspond to the completion of the first operation:
identifying, by the workspace monitoring platform, a second operation that is subsequent to the first operation in the set of operations for performing the first task; and
presenting, by the workspace monitoring platform in the user interface device, a second instruction, corresponding to the second operation, for the user to perform the second operation.

26. A system comprising:
one or more processors; and
memory storing instructions that, when executed by the one or more processors, cause the system to perform:
presenting, by a workspace monitoring platform in a user interface device, a first instruction, associated with a first operation in a set of operations for performing a first task, for a user to perform the first operation;
concurrently with presenting the first instruction:
capturing, by one or more sensors in a workspace monitoring platform, sensor data, wherein the one or more sensors include an image capture device; and
receiving a video stream from the image capture device that is based on the sensor data;
analyzing, by the workspace monitoring platform, the video stream, in real-time as the video stream is received from the image capture device, to detect a first set of one or more actions performed by the user;
determining, by the workspace monitoring platform, whether the first set of actions correspond to completion of the first operation associated with the first instruction that is currently being presented; and
responsive to determining, by the workspace monitoring platform, that the first set of actions correspond to the completion of the first operation:
identifying, by the workspace monitoring platform, a second operation that is subsequent to the first operation in the set of operations for performing the first task; and
presenting, by the workspace monitoring platform in the user interface device, a second instruction, corresponding to the second operation, for the user to perform the second operation.

\* \* \* \* \*